United States Patent
Choi et al.

(10) Patent No.: US 9,369,737 B2
(45) Date of Patent: *Jun. 14, 2016

(54) IMAGE ENCODER AND DECODER USING UNDIRECTIONAL PREDICTION

(71) Applicants: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR); UNIVERSITY-INDUSTRY COOPERATION GROUP OF KYUNG HEE UNIVERSITY, Seoul (KR)

(72) Inventors: Hae Chul Choi, Daejeon (KR); Se Yoon Jeong, Daejeon (KR); Sung-Chang Lim, Daejeon (KR); Jin Soo Choi, Daejeon (KR); Jin Woo Hong, Daejeon (KR); Dong Gyu Sim, Daejeon (KR); Seoung-Jun Oh, Gyeonggi-do (KR); Chang-Beom Ahn, Seoul (KR); Gwang Hoon Park, Gyeonggi-do (KR); Seung Ryong Kook, Gyeonggi-do (KR); Sea-Nae Park, Seoul (KR); Kwang-Su Jeong, Seoul (KR)

(73) Assignees: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR); UNIVERSITY-INDUSTRY COOPERATION GROUP OF KYUNG HEE UNIVERSITY, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/469,340

(22) Filed: Aug. 26, 2014

(65) Prior Publication Data

US 2014/0362916 A1   Dec. 11, 2014

Related U.S. Application Data

(63) Continuation of application No. 13/738,463, filed on Jan. 10, 2013, now Pat. No. 8,867,854, which is a continuation of application No. 13/129,570, filed as application No. PCT/KR2009/005647 on Oct. 1, 2009, now Pat. No. 8,363,965.

(30) Foreign Application Priority Data

| Oct. 1, 2008 | (KR) | 10-2008-0096658 |
| Jan. 7, 2009 | (KR) | 10-2009-0001240 |
| Sep. 30, 2009 | (KR) | 10-2009-0093128 |

(51) Int. Cl.

| G06K 9/36 | (2006.01) |
| H04N 19/91 | (2014.01) |
| H04N 19/50 | (2014.01) |
| H04N 19/70 | (2014.01) |
| H04N 19/61 | (2014.01) |
| H04N 19/593 | (2014.01) |
| H04N 19/11 | (2014.01) |
| H04N 19/132 | (2014.01) |
| H04N 19/587 | (2014.01) |
| H04N 19/124 | (2014.01) |
| H04N 19/44 | (2014.01) |
| H04N 19/625 | (2014.01) |

(52) U.S. Cl.
CPC ............ *H04N 19/91* (2014.11); *H04N 19/11* (2014.11); *H04N 19/124* (2014.11); *H04N 19/132* (2014.11); *H04N 19/44* (2014.11); *H04N 19/50* (2014.11); *H04N 19/587* (2014.11); *H04N 19/593* (2014.11); *H04N 19/61* (2014.11); *H04N 19/625* (2014.11); *H04N 19/70* (2014.11)

(58) Field of Classification Search
CPC ... H04N 19/00763; H04N 7/50; H04N 7/361; H04N 7/462; H04N 7/26244; H04N 7/26765; H04N 19/00127; H04N 19/00569; H04N 19/00781

See application file for complete search history.

(56) References Cited

U.S. PATENT DOCUMENTS

| | | | | |
|---|---|---|---|---|
| 5,652,629 | A | 7/1997 | Gonzales et al. | |
| 6,408,029 | B1 * | 6/2002 | McVeigh | H04N 19/105 348/699 |
| 8,059,717 | B2 * | 11/2011 | Saigo | H04N 19/176 375/240.12 |
| 8,363,965 | B2 * | 1/2013 | Choi | H04N 19/124 382/233 |
| 8,867,854 | B2 * | 10/2014 | Choi | H04N 19/124 382/236 |
| 2007/0041450 | A1 | 2/2007 | Kim et al. | |
| 2011/0249733 | A1 * | 10/2011 | Zhao | H04N 19/50 375/240.12 |
| 2012/0114038 | A1 * | 5/2012 | Han | H04B 1/662 375/240.12 |
| 2012/0288002 | A1 * | 11/2012 | Shin | H04N 19/44 375/240.16 |
| 2013/0272395 | A1 * | 10/2013 | Choi | H04N 19/124 375/240.12 |
| 2014/0362914 | A1 * | 12/2014 | Choi | H04N 19/124 375/240.12 |
| 2014/0362916 | A1 * | 12/2014 | Choi | H04N 19/124 375/240.12 |

FOREIGN PATENT DOCUMENTS

| | | |
|---|---|---|
| CN | 1492688 | 4/2004 |
| CN | 1937775 | 3/2007 |
| CN | 101159874 | 4/2008 |
| JP | 2004-140473 | 5/2004 |
| WO | WO 2007/105900 | 9/2007 |

OTHER PUBLICATIONS

Notice of Preliminary Rejection issued by the State Intellectual Property Office on Mar. 5, 2013.
International Search Report issued by World Intellectual Property Organization on Oct. 29, 2012.
Notice of Preliminary Rejection issued by the Korean Intellectual Property Office on Sep. 4, 2013.

* cited by examiner

*Primary Examiner* — Amir Alavi
(74) *Attorney, Agent, or Firm* — IP & T Group LLP

(57) ABSTRACT

The present invention relates to an image encoding and decoding technique, and more particularly, to an image encoder and decoder using unidirectional prediction. The image encoder includes a dividing unit to divide a macro block into a plurality of sub-blocks, a unidirectional application determining unit to determine whether an identical prediction mode is applied to each of the plurality of sub-blocks, and a prediction mode determining unit to determine a prediction mode with respect to each of the plurality of sub-blocks based on a determined result of the unidirectional application determining unit.

2 Claims, 14 Drawing Sheets

FIG. 4
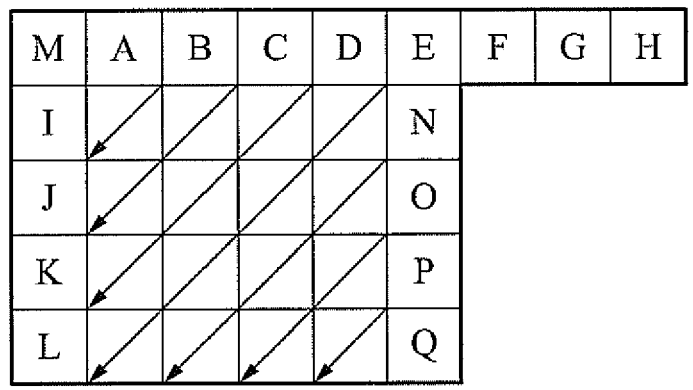
(a)
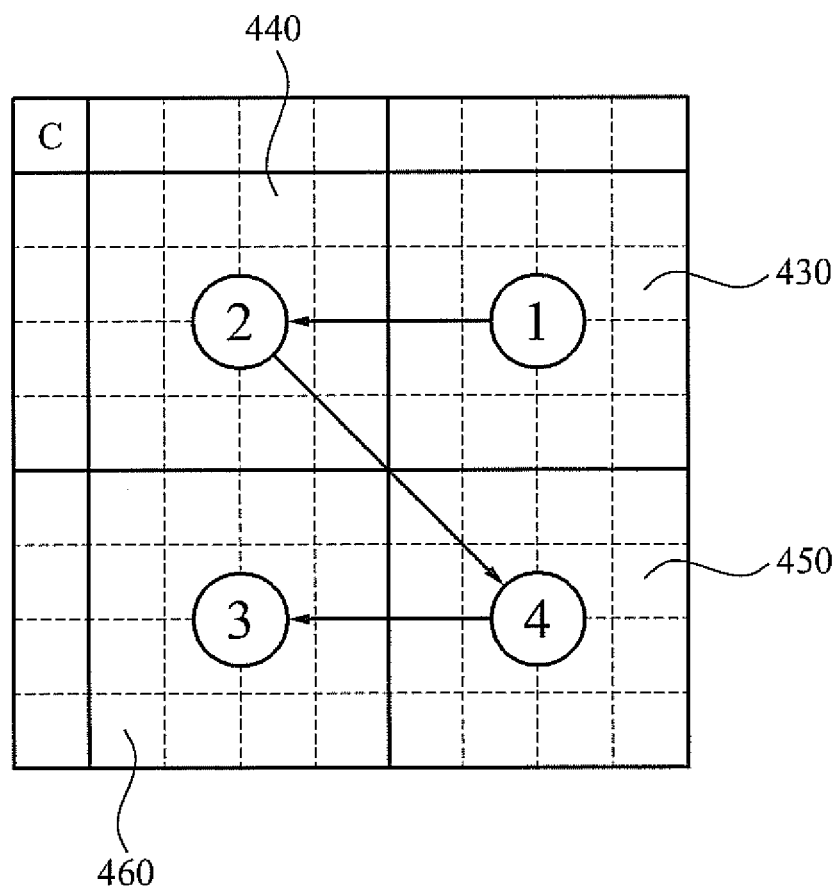
(b)

IMAGE ENCODER AND DECODER USING UNIDIRECTIONAL PREDICTION

CROSS-REFERENCE TO RELATED APPLICATIONS

This application is a continuation of U.S. patent application Ser. No. 13/738,463 filed on Jan. 10, 2013, now U.S. Pat. No. 8,867,854 which is a continuation of U.S. patent application Ser. No. 13/129,570 filed on May 16, 2011, now U.S. Pat. No. 8,363,965, which is a national stage application of PCT/KR2009/005647 filed on Oct. 1, 2008 and claims priority of Korean patent application numbers 10-2008-0096658, 10-2009-0001240, and 10-2009-0093128 filed on Oct. 1, 2008, Jan. 7, 2009, and Sep. 30, 2009, respectively. The disclosure of each of the foregoing applications is incorporated herein by reference in its entirety.

TECHNICAL FIELD

The present invention relates to an image encoding and decoding technique, and more particularly, to an image encoder and decoder using unidirectional prediction.

BACKGROUND ART

In video compression technologies such as Moving Picture Experts Group (MPEG) 4 and H.264 standards, various prediction schemes may be used to improve a compression effect. Of these, an intra prediction encoding scheme may be generally used.

An intra prediction mode may generate a prediction image using reference pixels existing at a periphery of a sub-block with respect to a plurality of sub-blocks included in a macro block, and may perform a differentiation with a current block intended to be encoded to generate a difference image. Depending on a location of the reference pixel with respect to each of the plurality of sub-blocks, a specific prediction mode may be determined.

The intra prediction encoding scheme may support an intra 16×16 encoding mode and an intra 4×4 encoding mode according to a size of the sub-block, and the H.264 standard may even support an intra 8×8 encoding mode.

The generated difference image may be transformed using a Discrete Cosine Transformation (DCT), a quantization process, and an eutrophy transformation. In the intra prediction encoding scheme, a number of bits in the transformed image may be calculated based on each prediction mode, and a distortion rate with an encoded block may be calculated to thereby calculate a bit-distortion rate with respect to each prediction mode. In this instance, a mode having a minimal bit-distortion rate may be determined as an optimal mode for performing an encoding with respect to the mode determined as the optimal mode.

Basically, the H.264 standard may perform encoding/decoding in a macro block unit of a 16×16 block. The intra 4×4 encoding mode may have to 4×4 sized sub-block. Accordingly, the intra 4×4 encoding mode may divide the macro block into 16 sub-blocks for the purpose of generating the prediction image. In the intra 4×4 encoding mode, 16 prediction mode information with respect to each sub-block may be needed. Similarly, in the intra 8×8 encoding mode, 4 prediction mode information may be needed due to a sub-block size of 8×8.

Accordingly, in the conventional H.264 moving picture compression standard, the intra 4×4 encoding mode information may be reduced using a Most Probable Mode (MPM), thereby improving an encoding efficiency.

However, in the conventional moving picture compression standard, a case where the intra prediction mode and an practical encoding mode are identical to each other in the intra 4×4 encoding mode may be consecutively generated, and thereby unidirectional flag information may be required to be added to reduce a number of bits to be encoded.

DISCLOSURE OF INVENTION

Technical Goals

An aspect of the present invention provides an image encoder and decoder using unidirectional prediction that may improve an encoding efficiency of an image.

An aspect of the present invention provides an image encoder and decoder using unidirectional prediction that may effectively encode an image, thereby reducing a capacity of the encoded image.

Technical Solutions

According to an aspect of the present invention, there is provided an image encoder, including: a dividing unit to divide a macro block into a plurality of sub-blocks; a unidirectional application determining unit to determine whether an identical prediction mode is applied to each of the plurality of sub-blocks; and a prediction mode determining unit to determine a prediction mode with respect to each of the plurality of sub-blocks based on a determined result of the unidirectional application determining unit.

According to an aspect of the present invention, there is provided an image encoder, including: a dividing unit to divide a Macro block into a plurality of sub-blocks; a prediction mode determining unit to determine a prediction mode with respect to each of the plurality of sub-blocks; and an encoding order determining unit to determine an encoding order with respect to each of the plurality of sub-blocks based on the prediction mode of the each of the plurality of sub-blocks.

According to an aspect of the present invention, there is provided an image decoder, including: a unidirectional application determining unit to determine whether an identical prediction mode is applied to each of a plurality of sub-blocks included in a macro block; and a decoding unit to decode each of the plurality of sub-blocks based on a determined result of the unidirectional application determining unit.

According to the present invention, an encoding efficiency of an image may be improved.

According to the present invention, an image may be effectively encoded. thereby reducing, a capacity of the encoded image.

BRIEF DESCRIPTION OF DRAWINGS

FIG. 4 illustrates an exemplary example of determining an encoding order of each sub-block depending on a prediction mode;

BEST MODE FOR CARRYING OUT THE INVENTION

Figure 1:
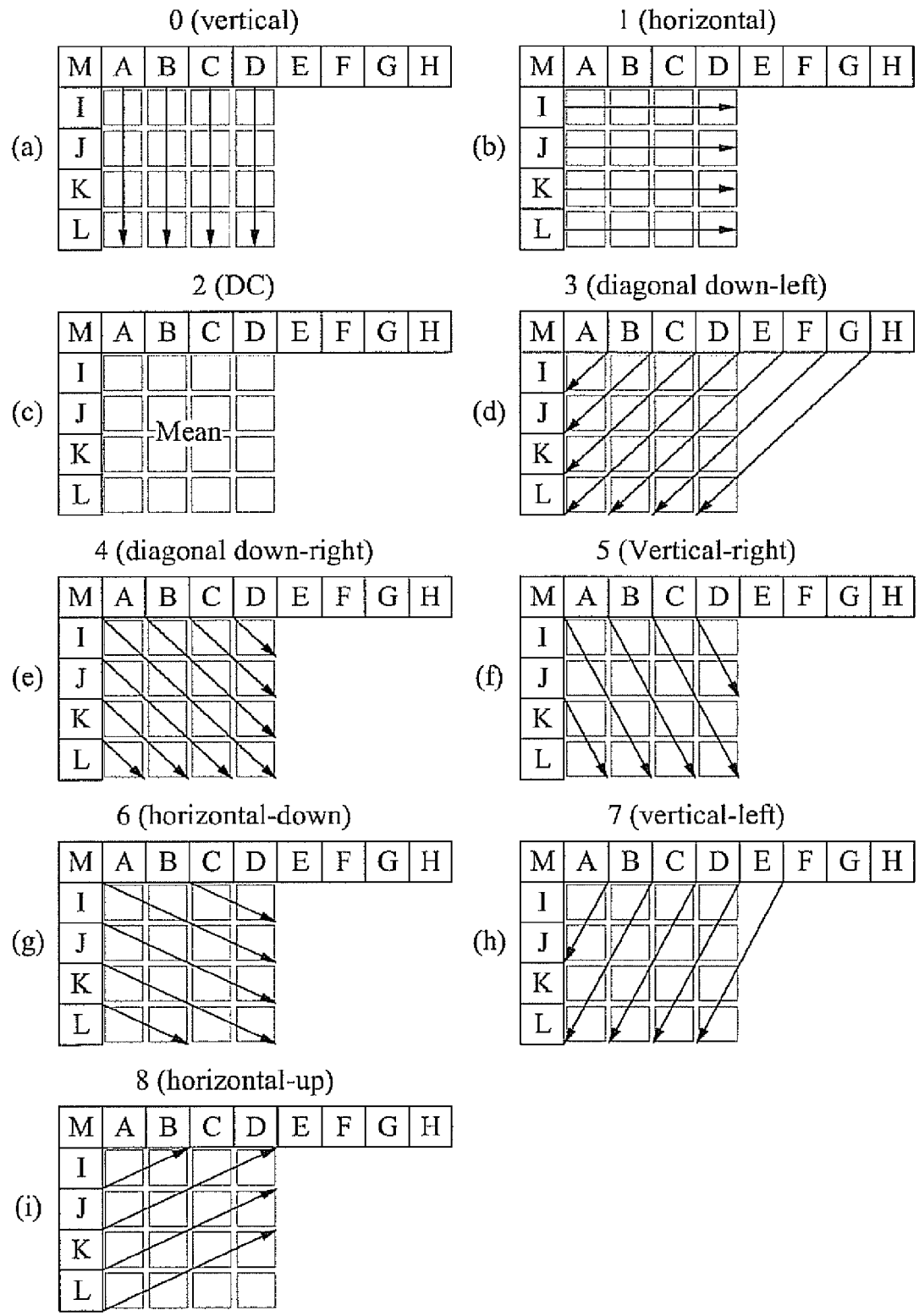
FIG. 1 illustrates various examples of an intra prediction mode.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates various examples of an intra prediction mode. A macro block intended to be encoded may be divided into at least one sub-block. An image encoder according to exemplary embodiments may calculate a difference between a pixel value of each sub-block and a pixel value of a reference pixel to generate a difference image, and encode the generated difference image.

When a value of the difference image is small, a relatively greater number of bits may be assigned to data within a small range, and thereby an image may be more accurately encoded to reduce a distortion. Depending on characteristics of an image included in each sub-block, a location of an optimum reference pixel may differ. Accordingly, the image encoder may select a location of the optimum reference pixel depending on characteristics of the image included in each sub-block, and may designate any one of nine prediction modes illustrated in (a) to (i) of FIG. 1 as the prediction mode with respect to each sub-block depending on the location of the reference location.

In FIG. 1, pixels located on the same arrow may be encoded with reference to a pixel value of an identical reference pixel. For example, in (a) of FIG. 1, pixels located in a first column of a 4×4 sub-block may be encoded with reference to a reference pixel A. Also, in (h) of FIG. 1, pixels located on a first row of the 4×4 sub-block may be encoded with reference to a reference pixel 1.

When the prediction modes with respect to each sub-block are different from each other, an image decoder of decoding an encoded image may be considered based on the prediction modes with respect to each sub-block. According to an exemplary embodiment, the image encoder may display the prediction modes with respect to each sub-block, and the image decoder may decode each sub-block with reference to the displayed prediction modes.

The image encoder may assign 3 bits or 4 bits to display the prediction modes with respect to each sub-block. When a 16×16 sized-macro block is divided into a 4×4 sized sub-block, the 16×16 sized-macro block may be divided into 16 sub-blocks, and displaying the prediction modes with respect to each sub-block may include superfluous information.

By using an identical prediction mode with respect to each sub-block included in an identical macro block, prediction modes with respect to each sub-block may not need to be displayed. As a result, an image encoding efficiency may be improved.

Figure 2:
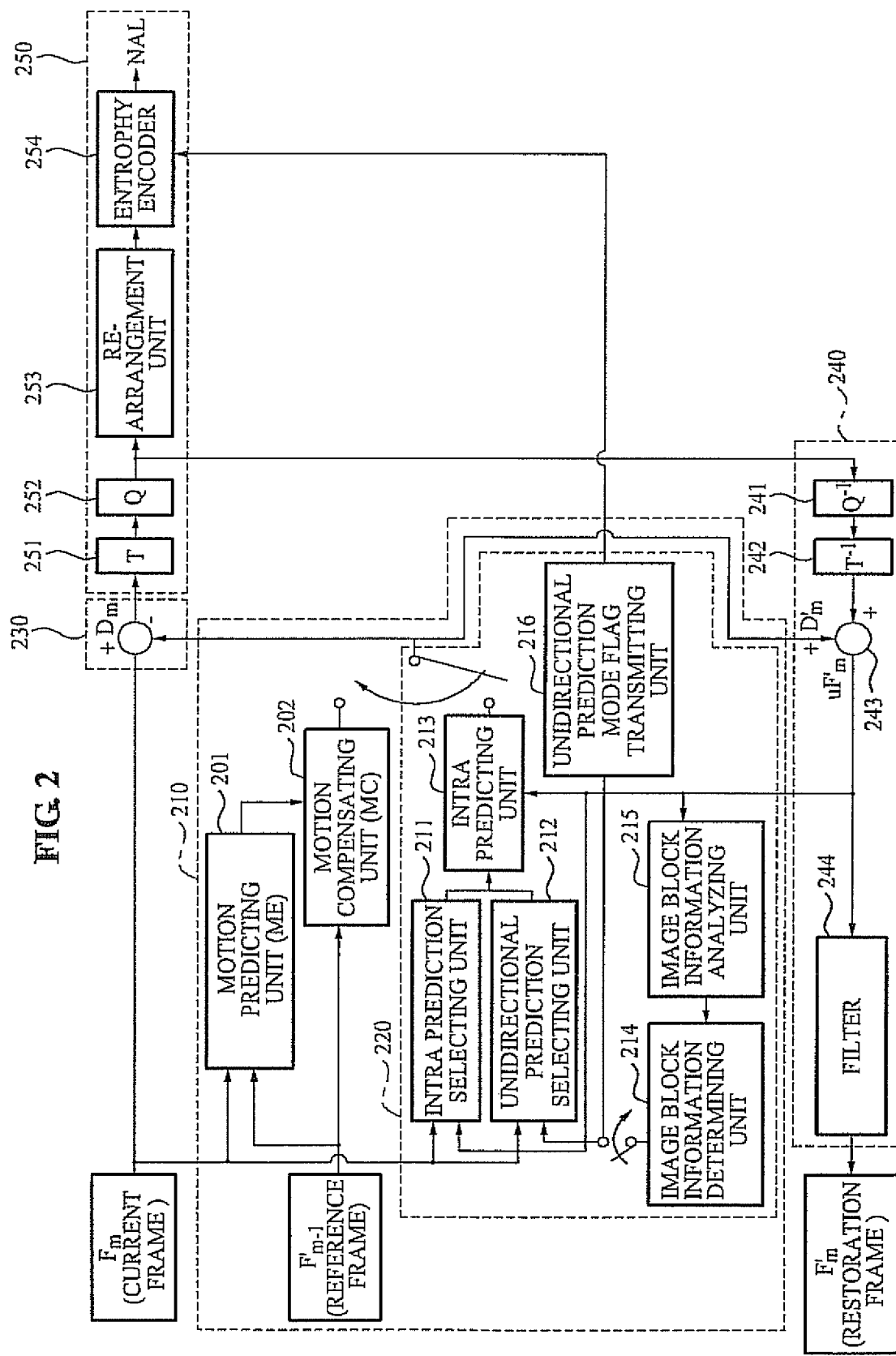
FIG. 2 is a block diagram illustrating a structure of an image encoder according to example embodiments.

FIG. 2 is a block diagram illustrating a structure of an image encoder according to example embodiments. The image encoder according to the present exemplary embodiment includes an image predicting unit 210, an intra predicting unit 220, a difference signal generator 230, an encoding unit 250, and a decoding unit 240.

The image predicting unit 210 may include a motion predicting unit 201, a motion compensating unit 202, and an Ultra predicting unit 220, and tray generate a prediction image with respect to an original image intended to be currently encoded.

Specifically, the intra predicting unit 220 may include an intra prediction selecting unit 211, a unidirectional prediction selecting unit 212, an intra predicting unit 213, an image block information determining unit 214, an image block information analyzing unit 215, and a unidirectional prediction mode flag transmitting unit 216. The intra predicting unit 220 may generate the intra prediction image with respect to the original image intended to be currently encoded.

Figure 3:
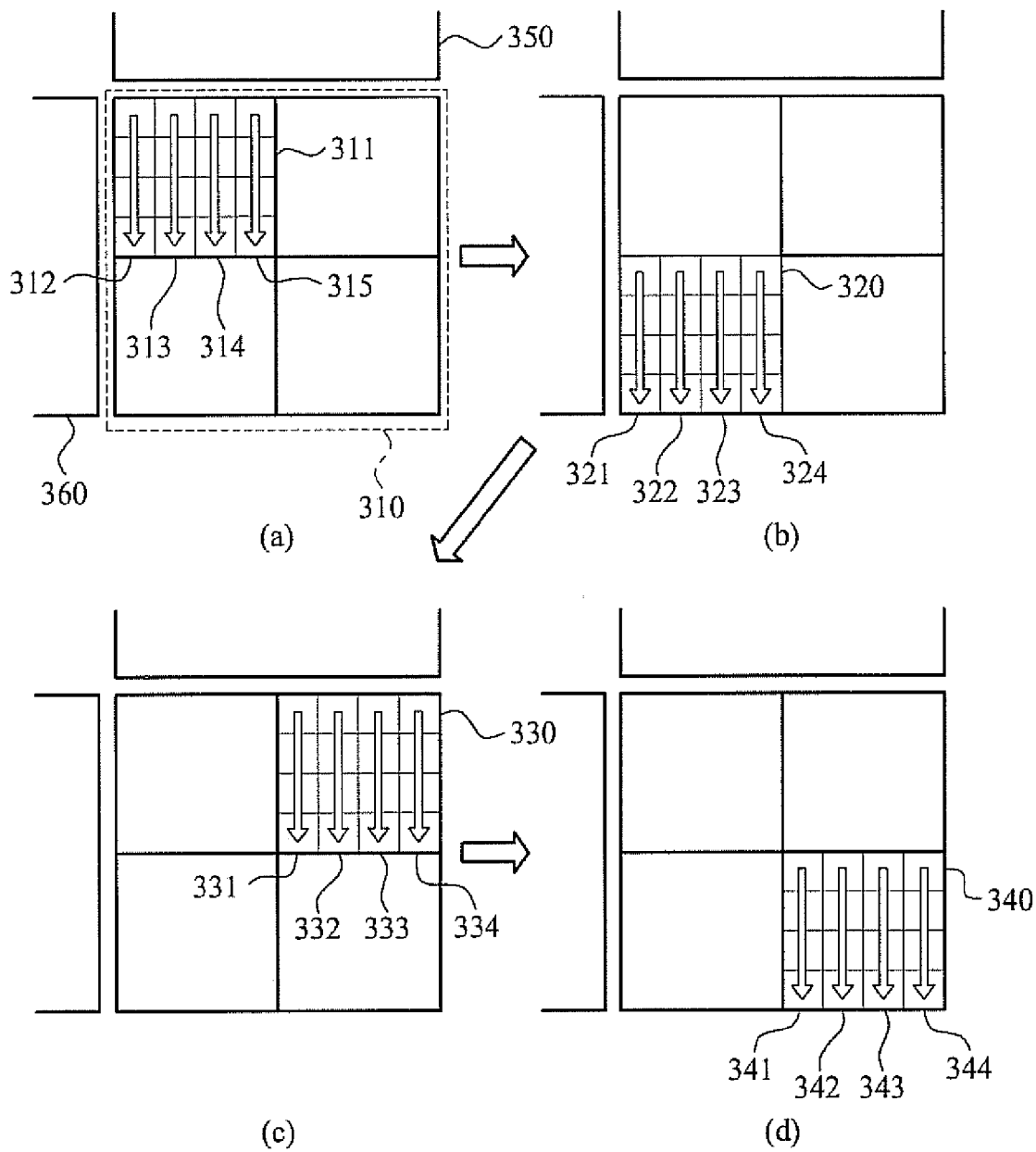
FIG. 3 is a schematic view illustrating unidirectional prediction according to exemplary embodiments.

Specifically, the image block information analyzing unit 215 may perform a context information analysis based on context information of image blocks 320 and 330 having been already decoded for an intra prediction of a current image block 310, as illustrated in FIG. 3. For example, the context information may be an MB type, a quantization coefficient, coded block pattern (CBP) information, a coefficient value, and the like. The image block information determining unit 214 may determine whether the unidirectional prediction is enabled based on an analyzed result of the image block information analyzing unit 215 to thereby determine whether the unidirectional prediction selecting unit 212 is practically performed. When the unidirectional prediction selecting unit 212 is performed, unidirectional prediction encoding information may be encoded.

The difference signal generator 230 may subtract a prediction image generated in the image predicting unit 210 from the original image intended to be currently encoded to generate a difference signal.

That is, the image predicting unit 210 may perform a motion prediction or a motion reference to encode a predetermined sized block in a current frame (Fn) intended to be encoded, and the difference signal generator 230 may generate a difference signal (Dn) with respect to a current block.

The encoding unit 250 may include a Discrete Cosine Transformation (DCT) unit 251, a quantization unit 252, a re-arrangement unit 253, and an entrophy encoder 254, and may encode an image with respect to the difference signal outputted in the difference signal generator 230 using the DCT unit 251, the quantization unit 252, the re-arrangement unit 253, and the entrophy encoder 254.

In addition, the decoding unit 240 may include an inverse quantization unit 241, an inverse DCT 242, an adder 243, and a filter 244. The decoding unit 240 may correct an original block to thereby restore an image even in a process of encoding the current block or the current frame in order to encode a subsequent block or a subsequent frame. More specifically, the decoding unit 240 may apply an inverse DCT and an inverse quantization process to a magnitude (output of the quantization unit 252) of the difference signal to which a DCT and quantization having been performed in the encoding unit 250, thereby restoring a magnitude of an original difference signal. The decoding unit 240 may perform a motion compensation with respect to the restored difference signal in the same manner as in the image predicting unit 210 to restore an original image, and may store the restored original image as a new reference image used for encoding a subsequent image.

FIG. 3 is a schematic view illustrating unidirectional prediction according to exemplary embodiments.

In (a) of FIG. 3, an example in which a prediction mode of a vertical direction is applied to a first sub-block 311 included in a macro block 310 is illustrated. Respective pixels included in the first sub-block 311 may be encoded with reference to pixels included in a macro block 350. According to an exemplary embodiment, pixels located in the lowest portion from among the pixels included in the macro block 350 may be reference pixels with respect to the first sub-block 311.

In (b) of FIG. 3, an example of the prediction mode of the vertical direction is applied to a second sub-block 320 included in the macro block 310 is illustrated. Each column included in the sub-block may be encoded with reference to the vertical direction. Respective pixels included in the second sub-block 320 may be encoded with reference to pixels included in the first sub-block 311, having already been encoded. Respective pixels included in the second sub-block 320 may be encoded with reference to pixels, as reference pixels, located in the lowest portion from among the pixels of the first sub-block 311.

In (c) and (d) of FIG. 3, the prediction mode of the vertical direction may also be applied to a third sub-block 330 and a fourth sub-block 340. Respective columns 331, 332, 333, 334, 341, 342, and 343 may be encoded with reference to the vertical direction. Respective pixels included in the third sub-block 330 may be encoded with reference to pixels included in the macro block 350 as reference pixels. According to an exemplary embodiment, pixels located in the lowest portion from among the pixels included in the macro block 350 may be reference pixels with respect to the first sub-block 330. Respective pixels included in the fourth sub-block 340 may be encoded with reference to pixels included in the third sub-block 330, having already been encoded, as reference pixels. Respective pixels included in the fourth sub-block 340 may be encoded with reference to pixels, as reference pixels, located in the lowest portion from among the pixels of the third sub-block 330.

The 'unidirectional prediction' used throughout the present invention may designate application of an identical prediction mode to the respective sub-blocks included in the macro block in a similar manner as in FIG. 3.

According to an exemplary embodiment, the image encoder may determine whether the unidirectional prediction is applied to the macro block 310 with reference to reference macro blocks 350 and 360 adjacent to the macro block 310.

According to an exemplary embodiment, the image encoder may determine whether the unidirectional prediction is applied to the macro block 310 with reference to context information of the reference macro blocks 350 and 360.

According to an exemplars embodiment, the context information may include at least one of an MB type with respect to the reference macro block, a quantization coefficient, a CBP information, and a coefficient value.

FIG. 4 illustrates an exemplary example of determining an encoding, order of each sub-block, depending on a prediction mode.

For example, when a downward and to the left diagonal direction illustrated in b) of FIG. 4 is applied as a prediction mode, pixels existing in E, F, G, and H may be determined as reference pixels with respect to respective sub-blocks, and the respective sub-blocks may be encoded using the determined reference pixels.

However, when the pixels existing in E, F, G and H are determined as the reference pixels, a distance between a sub-block of the downward and to the left diagonal direction and the reference pixel may be significantly increased. As a result, a difference between a value of the reference pixel and a value of the pixel existing in the sub-block of the downward and to the left diagonal direction may be significantly great. In this case, an encoding efficiency may be reduced.

According to an exemplary embodiment, when the diagonal down-left direction is applied as the prediction mode, the pixel existing in E, F, G, and H may be determined as the reference pixel to preferentially encode a sub-block of an upward and to the right diagonal direction. Next, pixels existing in the encoded sub-block of the diagonal up-right may be determined as reference pixels to encode the sub-block of the downward and to the left diagonal direction.

That is, an encoding order with respect to respective sub-blocks may be determined depending on the prediction modes. Since a distance between the reference pixel and the sub-block is small, a difference between a value of the reference pixel and a value of a pixel intended to be encoded may not be great. That is, an accuracy of the prediction may be improved, and the encoding efficiency may be improved.

Referring to FIG. 4, a concept of determining the encoding order with respect to the respective sub-blocks depending on the prediction modes will be herein described in detail.

As illustrated in (b) of FIG. 4, it is assumed that an 8×8 sized-block is divided into four 4×4 blocks 430, 440, 450, and 460 and the divided blocks are encoded.

According to a conventional art, an encoding order with respect to respective sub-blocks 430, 440, 450 and 460 may be determined without considering a prediction mode, Consequently, the respective sub-blocks 430, 440, 450, and 460 each corresponding to upward and to the right diagonal direction, upward and to the left diagonal direction, downward and to the right diagonal direction, and downward and to the left diagonal direction may be encoded in the order described above.

As illustrated in (a) of FIG. 4, it is assumed that the diagonal down-left direction is determined as a prediction direction. According to a conventional encoding scheme, when encoding the sub-blocks 440 and 460 of up-left and the down-right, peripheral pixels used at the time of prediction may be E, F, G, and H. Since right blocks of each block are not encoded yet, N, O, P, and Q may not be used. Accordingly, since a distance between a pixel intended to be referred to and a pixel intended to be encoded is relatively great, the prediction efficiency may be reduced.

According to an exemplary embodiment, an encoding order with respect to respective sub-blocks may be determined depending on prediction modes with respect to the respective sub-blocks. As an example, an encoding order with respect to the respective sub-blocks may be determined so that a sub-block including a reference pixel is encoded prior to a sub-block intended to be encoded.

As illustrated in (a) of FIG. 4, when a direction down-left direction is selected as a prediction mode, an encoding order may be determined so that the respective sub blocks 430, 440, 450, and 460 each corresponding to upward and to the right diagonal direction, upward and to the left diagonal direction, downward and to the right diagonal direction, and downward and to the left diagonal direction are encoded in the stated order as illustrated in (b) of FIG. 4.

Since the sub-block including the reference pixel is encoded prior to the sub-block to be encoded, the respective sub-blocks may be encoded with reference to a pixel of an adjacent block having been already encoded. Since a distance between the reference pixel and the pixel to be encoded is relatively small, the prediction efficiency may be improved.

When the block of the diagonal down-left is the prediction mode, there may exist peripheral pixels N, O, P, and Q located in a new adjacent block having been already encoded. Accordingly, as illustrated in (a) of FIG. 4, the sub-blocks may be encoded with reference to the peripheral pixels N, O, P, and Q.

Only the diagonal down-left direction was described in detail in FIG. 4, however, the present exemplary embodiment may be similarly applied with respect to (h) vertical-left direction and (i) horizontal-up direction from among the prediction modes illustrated in FIG. 1.

Figure 5:
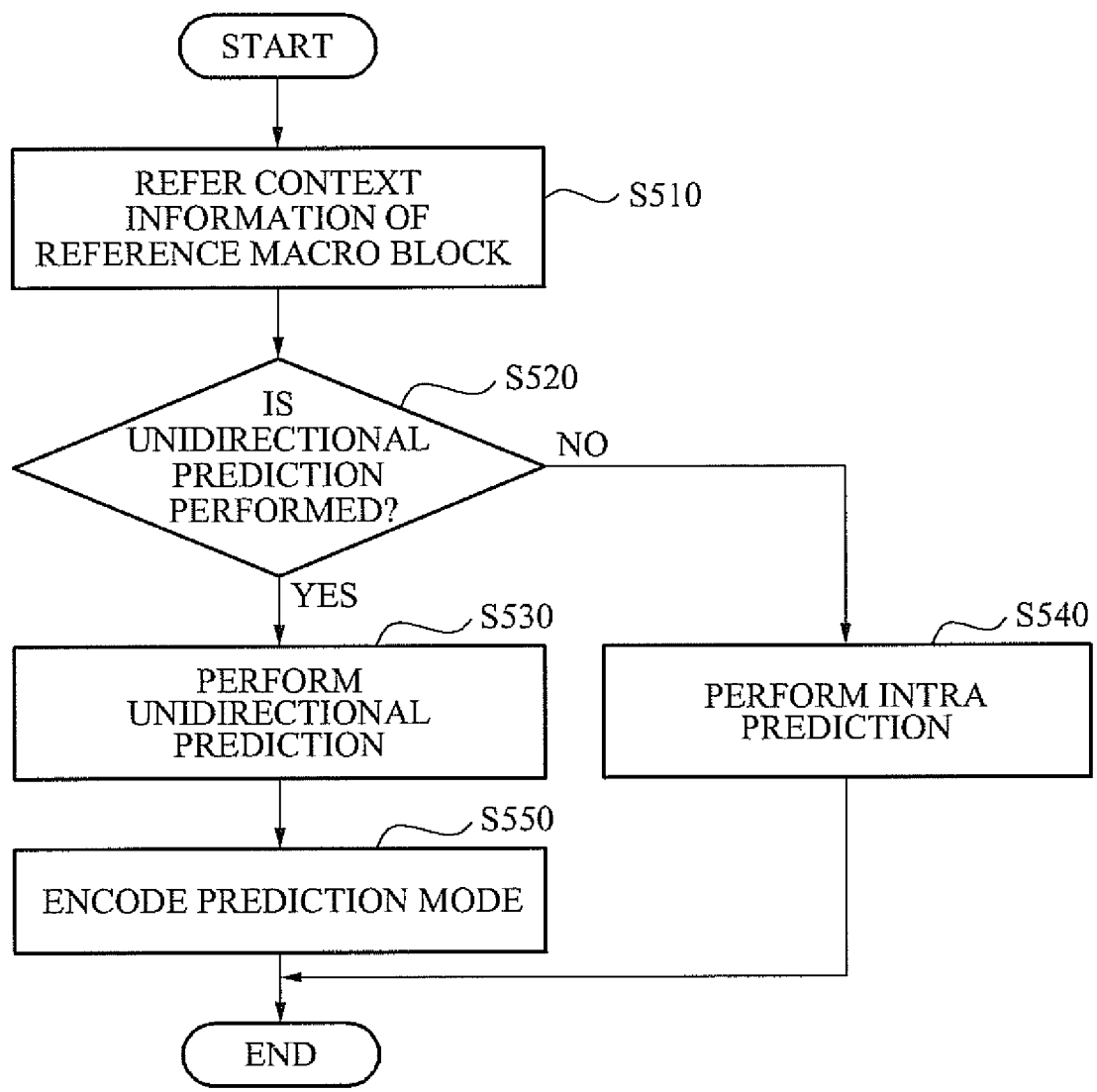
FIG. 5 is a flowchart illustrating an exemplary example of determining whether to perform unidirectional prediction with reference to context information of a reference macro block.

FIG. 5 is a flowchart illustrating an exemplary example of determining whether to perform unidirectional prediction with reference to context information of a reference macro block.

In operation S510, The image encoder may infer context information of a reference macro block. The reference macro block may be a macro block adjacent to a macro block intended to be encoded by the image encoder, and may be a macro block having been already encoded. Also, the reference macro block may include a reference pixel with respect to the macro block intended to be encoded by the image encoder.

According to an exemplary embodiment, the context information may include at least one of an MB type with respect to the reference macro block, a quantization coefficient, CBP information, and a coefficient value.

In operation S520, the image encoder may determine whether a unidirectional prediction is performed with respect to the macro block intended to be encoded. According to an exemplary embodiment, the image encoder may determine whether the unidirectional prediction is performed with reference to the context information of the reference macro block.

In operation S530, when the unidirectional prediction is determined to be performed in operation S520, the image encoder may perform the unidirectional prediction with respect to the macro block intended to be encoded. The unidirectional prediction may denote application of an identical prediction mode to all sub-blocks included in the macro block.

According to an exemplary embodiment, the image encoder may select an optimum prediction mode from among nine prediction modes illustrated in FIG. 1 to thereby apply the selected prediction mode to all sub-blocks included in the macro block.

According to an exemplary embodiment, the image encoder may encode respective macro blocks depending on the nine prediction modes, and calculate a rate-distortion cost with respect to the encoded image. The rate-distortion cost may be a value calculated considering both a distortion and data rate of an encoded image. The image encoder may select a prediction mode having a relatively low rate-distortion cost as an optimum prediction mode.

In operation S540, when the unidirectional prediction is determined not to be performed, the image encoder in operation S520, the image encoder may perform an intra prediction. The intra prediction may denote to determine an optimal prediction mode with respect to the respective sub-blocks included in the macro block, and different prediction modes with respect to the respective sub-blocks may be determined.

In operation S550, the image encoder may encode the prediction mode. The image encoder may encode whether the unidirectional prediction is applied to the macro block, and encode which prediction mode is the applied prediction mode.

When the unidirectional prediction is not applied, the image encoder may encode the prediction node applied with respect to the respective sub-blocks.

Figure 6:
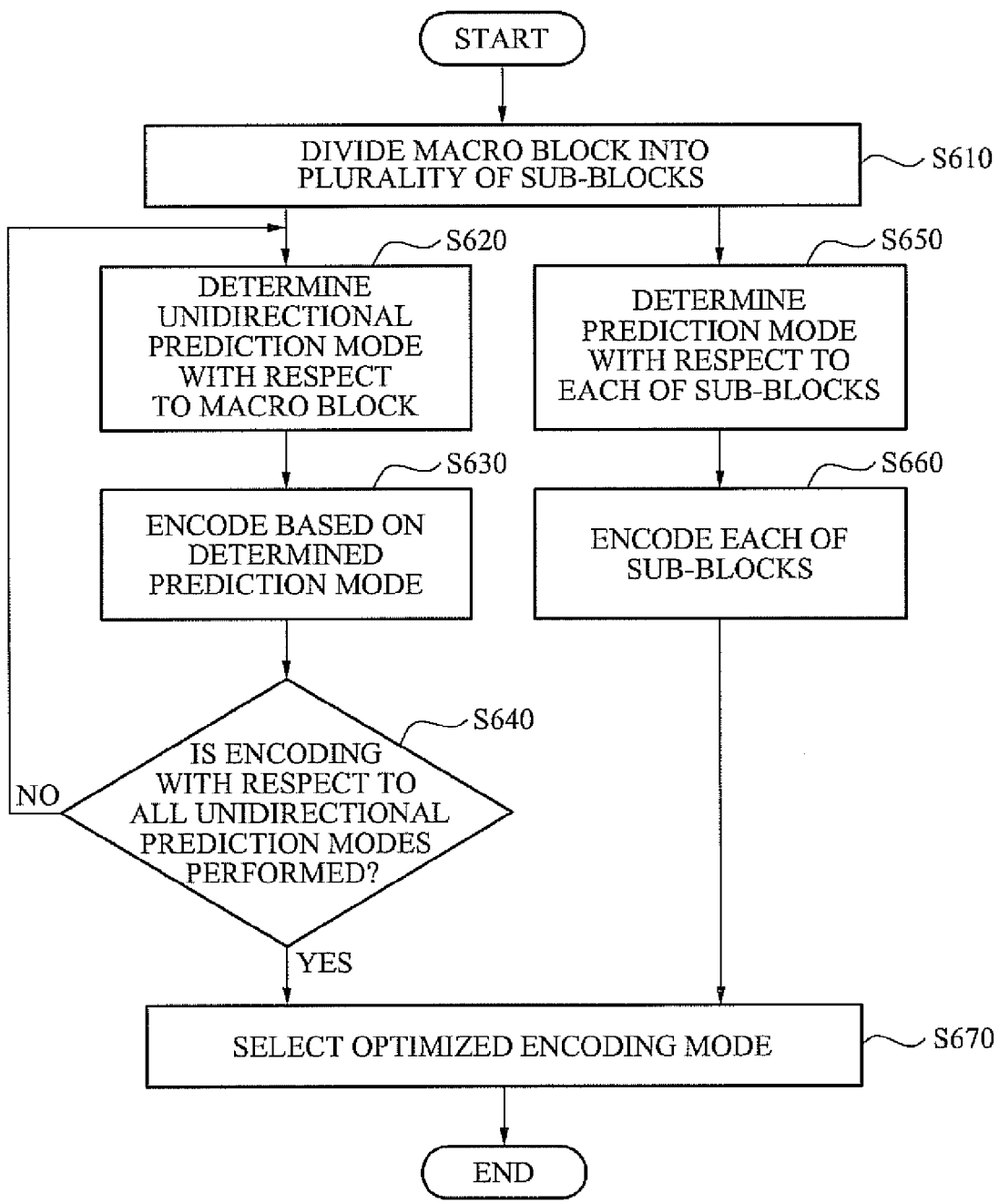
FIG. 6 is a flowchart illustrating an exemplary example of determining an encoding mode with respect to a macro block.

FIG. 6 is a flowchart illustrating an exemplary example of determining an encoding mode with respect to a macro block.

In operation S610, the image encoder may divide a macro block into a plurality of sub-blocks.

In operation S620, the image encoder may determine a unidirectional prediction mode with respect to the macro block. The unidirectional prediction mode determined in operation S620 may be one of the prediction modes illustrated in FIG. 1.

In operation S630, the image encoder may encode the macro block according to the determined prediction mode. The image encoder may apply an identical prediction mode to each of the plurality of sub-blocks included in the macro block to thereby encode the macro block.

In operation S640, the image encoder may determine whether an encoding is performed with respect to all prediction modes. When the encoding is not performed with respect to all prediction modes, the image encoder may determine, as the unidirectional prediction mode, a prediction mode to which an encoding is not yet performed in operation S620.

In operation S650, the image encoder may determine a prediction mode with respect to each of the plurality of sub-blocks. The image encoder may determine different prediction modes with respect to each of the plurality of sub-blocks.

In operation S660, the image encoder may encode each of the plurality of sub-blocks according to the prediction mode differentially determined with respect to each of the plurality of sub-blocks.

That is, in operations S650 and S660, the image encoder may encode the macro block according to an intra mode.

In operation S670, the image encoder may select an optimal encoding mode from among the unidirectional prediction mode and the intra mode. Since an optimal prediction mode is selected with respect to each of the plurality of sub-blocks, the intra mode may have less distortion in comparison with the unidirectional prediction mode.

However, since the unidirectional prediction mode applies an identical prediction mode with respect to each of the plurality of sub-blocks, there is no need to store the prediction mode with respect to each of the plurality of sub-blocks. As a result, the macro block may be encoded using a data rate less than that of the intra mode.

In operation S670, the image encoder may calculate a rate-distortion cost with respect to the unidirectional prediction mode and the intra mode, and select an optimal encoding mode based on the calculated rate-distortion cost.

Figure 7:
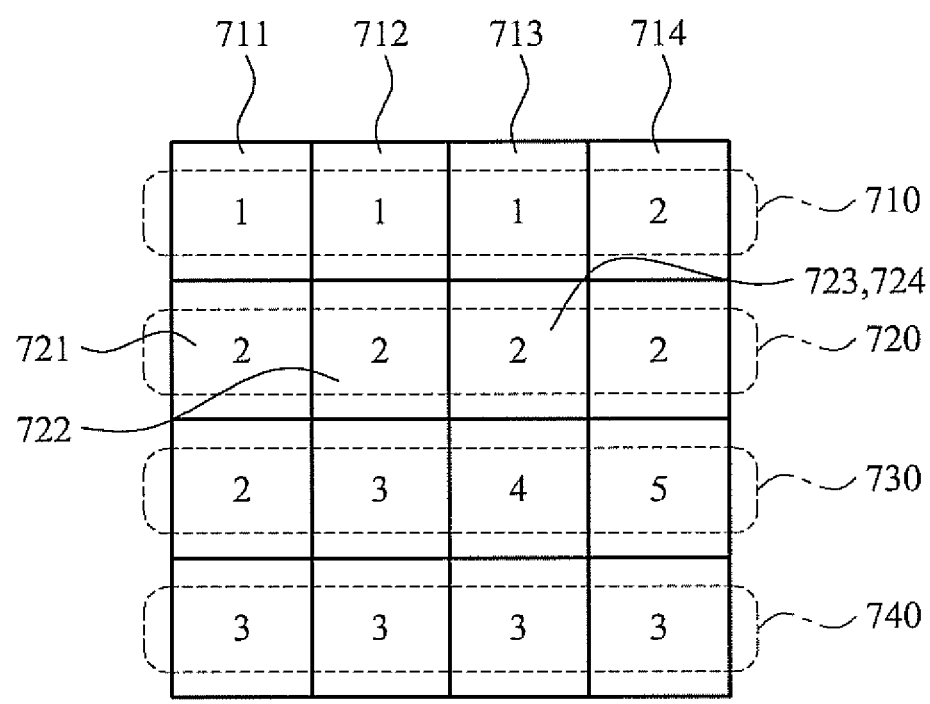
FIG. 7 illustrates an exemplary example of determining whether prediction modes of sub-blocks included in each sub-block group are identical to each other.

FIG. 7 illustrates an exemplary example of determining whether prediction modes of sub-blocks included in each sub-block group are identical to each other.

The image encoder may divide each of the plurality of sub-blocks included in a macro block, into at least one sub-block. group 710, 720, 730, and 740. In FIG. 7, an example in which each sub-block group includes four sub-blocks is illustrated, however, according to another exemplary embodiment, each sub-block may have different numbered-sub-blocks.

The image encoder may determine an optimal encoding mode with respect to each sub-block. A numeral expressed on each sub-block may designate an optimal encoding mode determined with respect to each sub-block.

A first sub-block 711, a second sub-block 712, and a third sub-block 713 may have a first encoding mode as the optimal encoding mode, from among respective sub-blocks 711, 712, 713, and 714 included in a first sub-block group 710, and a fourth sub-block 714 may have a second encoding mode as the optimal encoding mode. That is, the encoding modes of the sub-blocks 711, 712, 713, and 714 included in the first sub-block group 710 are not the same.

Whereas, respective sub-blocks 721, 722, 723, and 724 included in a second sub-block group 720 may have an identical encoding mode of a second encoding mode.

According to an exemplary embodiment, the image encoder may encode whether encoding modes of the sub-blocks included in each sub-block group are all the same.

When the encoding modes are all the same, the image encoder may display an encoding mode with respect to each sub-block group, and may not display an encoding mode with respect to each sub-block. As a result, a number of bits required for encoding may be reduced, and an encoding efficiency may be improved.

Figure 8:
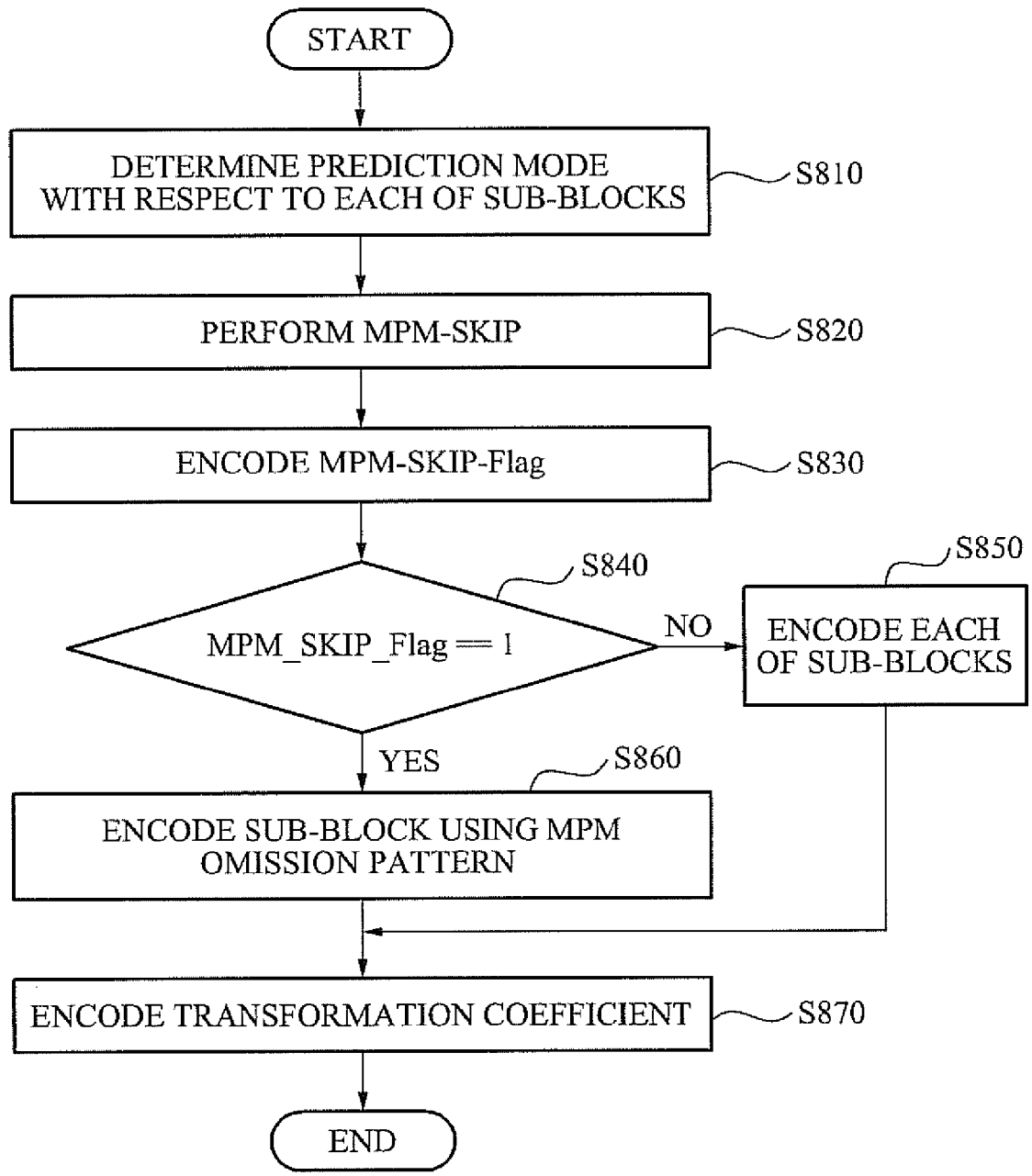
FIG. 8 is a flowchart illustrating an exemplary example of omitting a Most Probable Mode (MPM) flag encoding to improve an encoding efficiency when MPM flags of sub-blocks included in each sub-block group are consecutively identical to each other.

FIG. 8 is a flowchart illustrating an exemplary example of omitting a Most Probable Mode (MPM) flag encoding to improve an encoding efficiency when MPM flags of sub-blocks included in each sub-block group are consecutively identical to each other.

In operation S810, an image encoder may determine a prediction mode with respect to each sub-block. Also, the image encoder may predict the prediction mode with respect to each sub-block.

In operation S820, the image encoder may check sub-blocks in which the predicted prediction mode and the determined prediction mode are the same from among a plurality of sub-blocks. Hereinafter, when the predicted prediction mode and the determined prediction mode are the same, the sub-block may be encoded using an MPM.

In operation S830, the image encoder may set an MPM-SKIP-Flag as '1', when a sub-block encoded using the MPM within a macro block is present, and when the sub-block encoded using the MPM within the macro block is not present, the image encoder may set the MPM-SKIP-Flag as '0'.

In operation S840, the image encoder may compare a value of the MPM-SKIP-Flag with '1'. When the value of the MPM-SKIP-Flag is not '1', it indicates that the sub-block encoded using the MPM is present, and thus the image encoder may check the sub-block encoded using the MPM in operation S860 to generate an MPM omission pattern, and encode a prediction mode with respect to the sub-block using the MPM omission pattern.

A specific configuration of encoding the prediction mode with respect to the sub-block using the MPM omission pattern will be described in detail with reference to FIG. 9.

In operation S870, the image encoder may encode remaining transformation coefficients with respect to a difference image.

Figure 9:
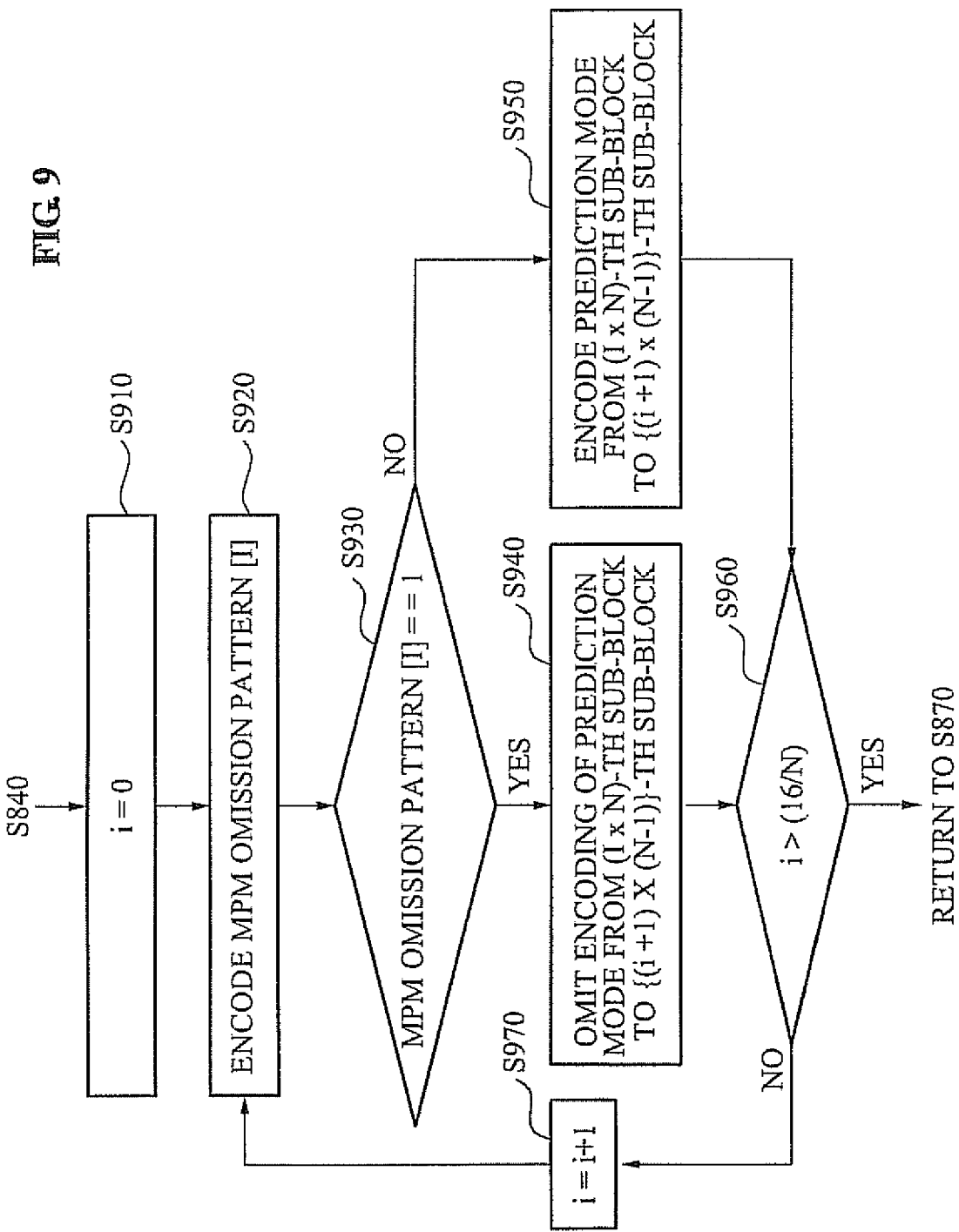
FIG. 9 is a flowchart illustrating an exemplary example of omitting an MPM flag to improve an encoding efficiency.

FIG. 9 is a flowchart illustrating an exemplary example of omitting an MPM flag to improve an encoding efficiency.

In operation S910, an image encoder may initialize i for counting a repeated frequency in order to perform an MPM omission pattern encoding.

In operation S920, the image encoder may encode an [i]-th bit of the MPM omission pattern. The image encoder may group consecutive N sub-blocks included in a macro block to set a sub-block group. The image encoder ma encode the [i]-th bit of the MPM omission pattern with respect to an i-th sub-block group. As an example, an (i+1)-th sub-block group may include an (i*N)-th sub block group to an {N*(i+1)−1}-th sub-block group.

When an (i*N)-th sub block to an {N*(i+1)−1}-th sub-block included in the (i+1)-th sub-block group from among the sub-blocks included in the macro block are all encoded using the MPM mode, the image encoder may encode the [i]-th bit of the MPM omission pattern as '1'. Otherwise, the image encoder may encode the [i]-th bit of the MPM omission pattern as '0'.

In operation S930, the image encoder may check a value of the [i]-th bit of the MPM omission pattern. When the value of the [i]-th bit of the MPM omission pattern is '1', the (i*N)-th sub block group to the {N*(i+1)−1}-th sub-block of the macro block are all encoded using the MPM mode, and thus the image encoder may omit a prediction mode encoding with respect to the (i*N)-th sub block group to the {N*(i+1)−1}-th sub-block may be omitted in operation S940. When the value of the [i]-th bit of the MPM omission pattern is '0', the image encoder may perform the prediction mode encoding with respect to the (i*N)-th sub block group to the {N*(i+1)−1}-th sub-block of the macro block.

In operation S960, the image encoder may determine whether the prediction mode encoding with respect to each sub-block is terminated. When the prediction mode encoding is not terminated, the image encoder may increase i in operation S970, and perform the prediction mode encoding with respect to a subsequent sub-block group.

Referring to FIGS. 8 and 9, when similar information with respect to consecutive sub-blocks is determined to have an identical value, an encoding only with respect to an initial sub-block may be performed, and then an encoding with respect to subsequent sub-blocks may be omitted, thereby improving an encoding efficiency.

Figure 10:
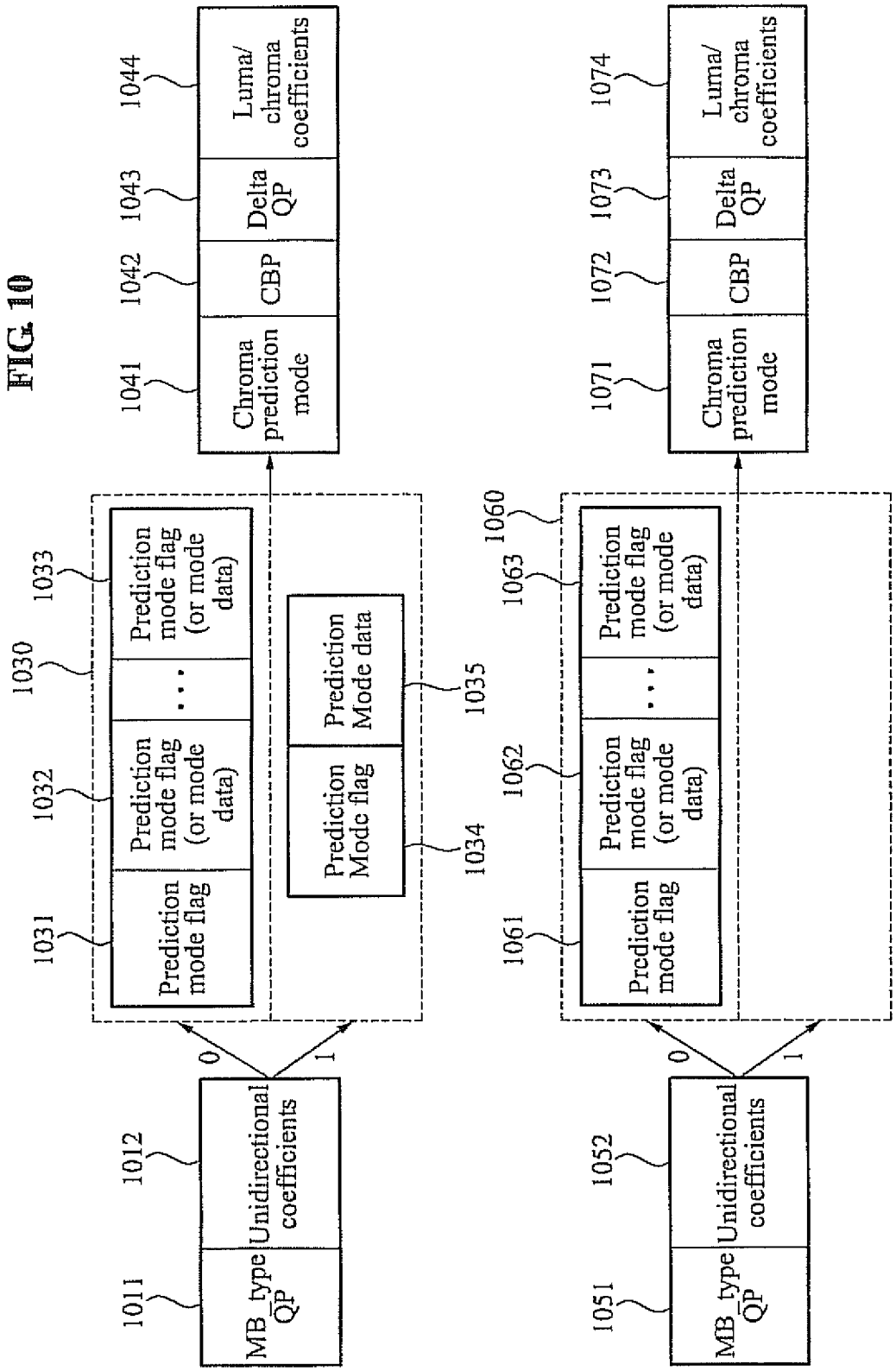
FIG. 10 illustrates an exemplary example of encoding a unidirectional coefficient indicating whether unidirectional prediction is applied.

FIG. 10 illustrates an exemplary example of encoding a unidirectional coefficient indicating whether unidirectional prediction is applied.

The unidirectional coefficients 1012 indicating whether the unidirectional prediction is applied 1012 to a macro block may be encoded together with an MB type with respect to the macro block. When the unidirectional prediction is not applied to the macro block, a value of the unidirectional coefficient 1012 may be '0'. In this case, a conventional intra prediction mode is applied to the macro block. When the intra prediction mode is applied to the macro block, a prediction mode flag or prediction mode data 1031, 1032, and 1033 with respect to each sub-block may be encoded.

When the unidirectional prediction is applied to the macro block, the value of the unidirectional coefficient 1012 may be '2'. In this case, a prediction mode flag 1034 and prediction mode data 1035 with respect to the macro block may be encoded once. Accordingly, when the unidirectional prediction is applied to the macro block, a number of bits required for encoding the prediction mode ma be reduced, and a data rate may be improved.

The unidirectional coefficients 1012 may be encoded together with a chroma prediction mode 1041, a CBP 1042, a delta QP, and luma/chroma coefficients 1044.

According to another exemplary embodiment, even when the unidirectional prediction is applied to the macro block, information about the unidirectional prediction mode applied to the macro block may not be encoded. That is, even when the unidirectional prediction is applied to the macro block, the prediction mode flag and the prediction mode data may not be encoded. The image encoder may predict the unidirectional prediction mode based on context information of a reference macro block with respect to the macro block.

Figure 11:
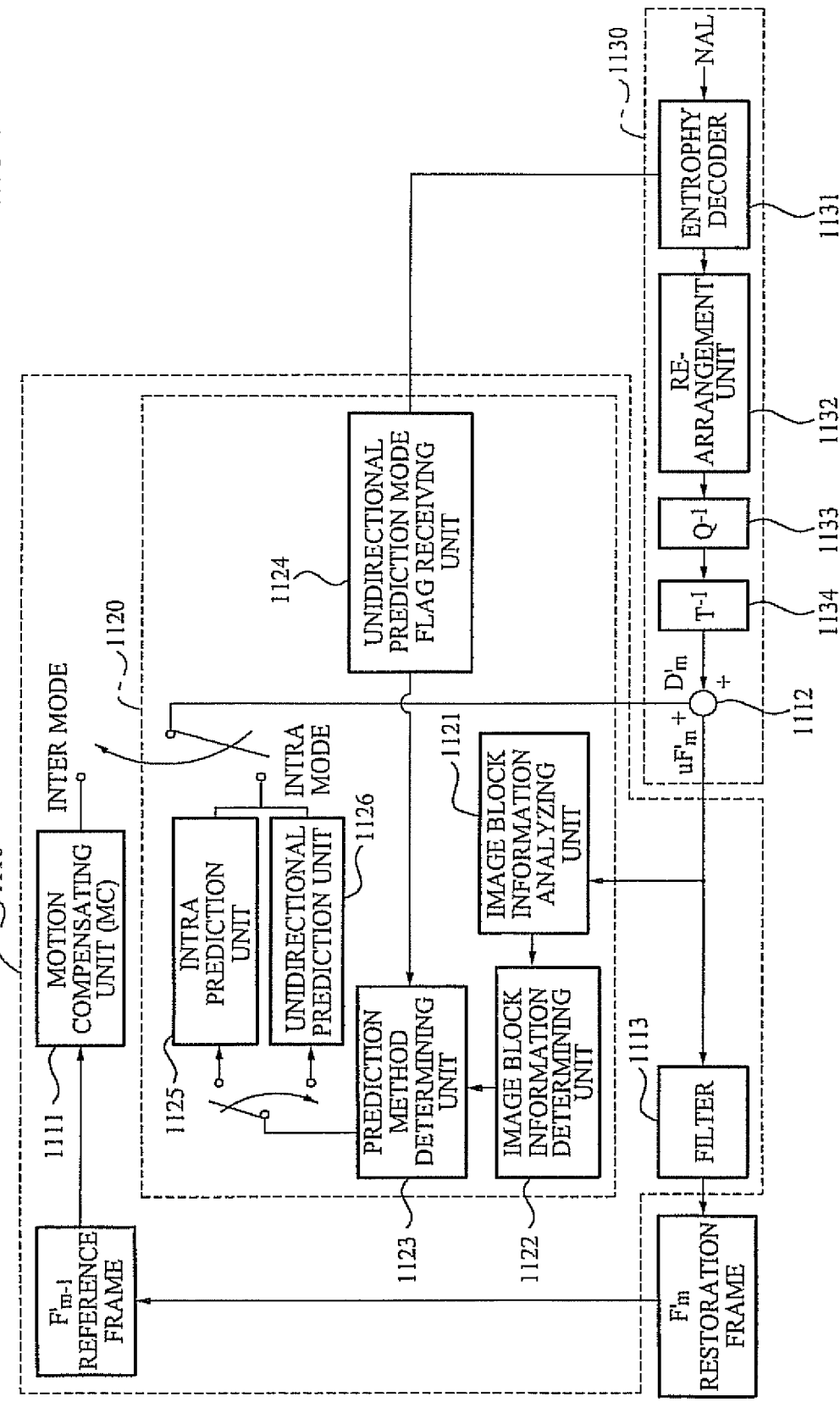
FIG. 11 is a block diagram illustrating a structure of an image decoder according to exemplary embodiments.

FIG. 11 is a block diagram illustrating a structure of an image decoder according to exemplary embodiments. The image decoder includes an image decoding unit 1110, an intra predicting unit 1120, and a decoding unit 1130.

The decoding unit 1130 may include an entropy decoder 1131, a re-arrangement unit 1132, an inverse quantization unit 1133, and an inverse DCT unit 1134, and may perform decoding processes such as an entropy decoding, data re-arrangement, an inverse-quantization, and an inverse DCT with respect to a hit column received from the image encoder described in FIG. 1, in a similar manner as in an existing moving picture compression standards.

The image decoding unit 1110 may include a motion compensating unit 111, an intra prediction unit 1120, an adder 1112, and a filter 1113, and may decode an original image using a decoded difference signal and a reference image (previous image).

The intra prediction unit 1120 may include an image block information analyzing unit 1121, an image block information determining unit 1122, a prediction method determining unit 1123, a unidirectional prediction mode flag receiving unit 1124, an intra prediction unit 1125, and a unidirectional prediction unit 1126, and generate an intra prediction image with respect to an image intended to be currently decoded.

Specifically, the image block information analyzing unit 1121 may analyze context information based on context information of a macro block having been already decoded for the purpose of intra prediction of a macro block intended to be decoded. For example, an MB type, a quantization coefficient, CBP information, a coefficient value, and the like may be the context information.

The image block information determining unit 1122 may determine whether the unidirectional prediction is possible to be performed based on an analyzed result of the image block information analyzing unit 121.

The prediction method determining unit 1123 may perform an intra prediction by selecting one of the intra prediction unit 1125 and the unidirectional prediction unit 1126 through a value transmitted from the image block information determining unit 1122 and the unidirectional prediction mode flag receiving unit 1124.

For example, when the image block information determining unit 1122 determines a unidirectional prediction method is impossible to be performed, the intra prediction may be performed by the intra prediction unit 1125, and when the image block information determining unit 1122 determines the unidirectional prediction method is possible to be performed, the intra prediction unit 1125 may be selected to perform the intra prediction in a case of a flag value transmitted from the unidirectional prediction mode flag receiving unit 1124 having a value of '0', and the unidirectional prediction unit 1126 may be selected to perform the intra prediction in a case of the flag value having a value of '1'.

Also, even when a value of a unidirectional prediction method flag '0', values of an intra prediction mode flag and intra mode information may exist as illustrated in FIG. 10.

According to another exemplary embodiment, even when the value of the unidirectional prediction method flag is '1', the values of the intra prediction mode flag and intra mode information may not exist. In this case, the image decoder may predict the prediction mode of the macro block based context information of the reference macro block. In this manner, a practical intra prediction may be performed using the intra prediction mode flag and the intra mode information.

Figure 12:
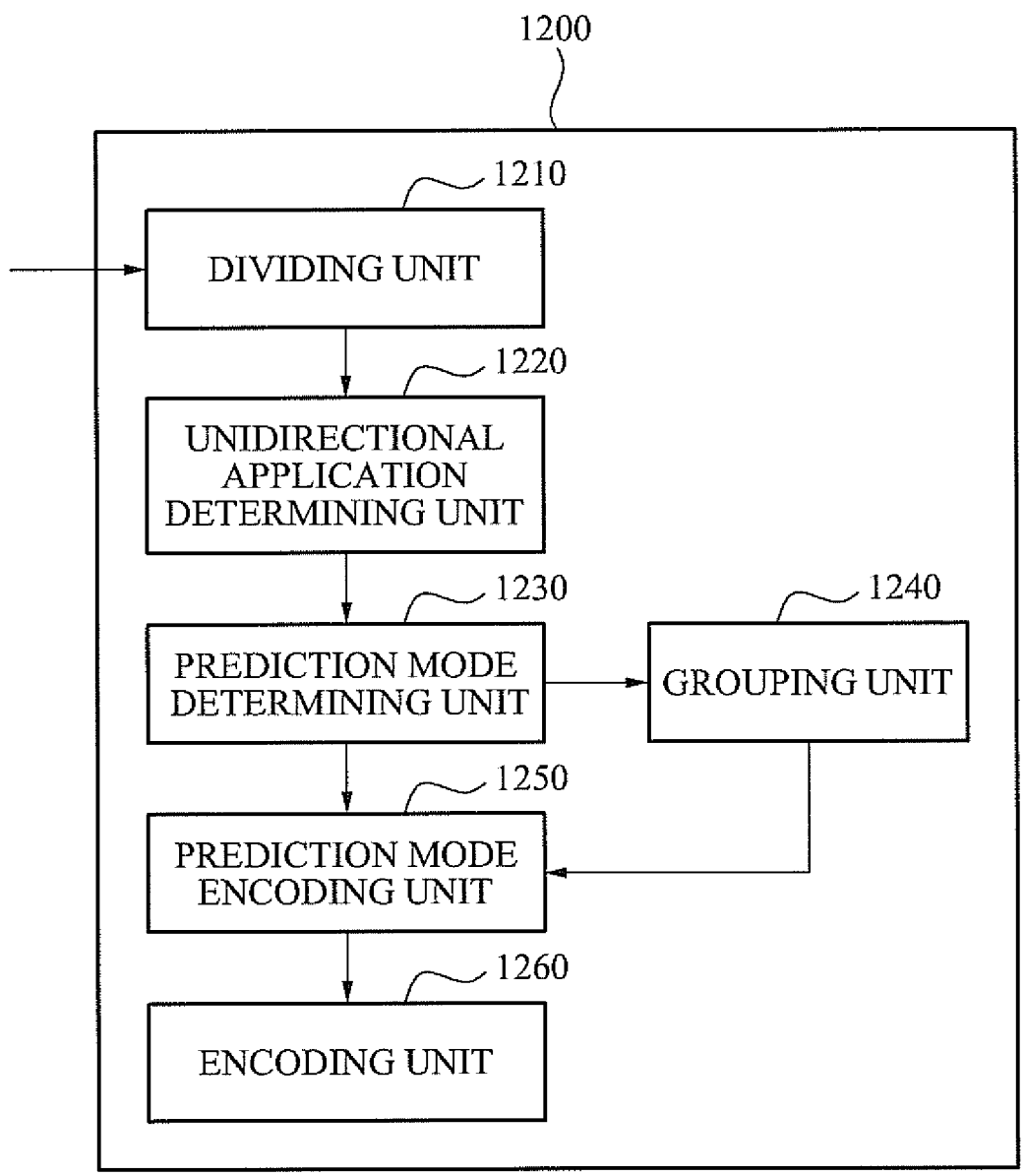
FIG. 12 is a block diagram illustrating a structure of an image encoder according to other exemplary embodiments.

FIG. 12 is a block diagram illustrating a structure of an image encoder according to other exemplary embodiments.

A dividing unit 1210 may divide a macro block into a plurality of sub-blocks.

A unidirectional application determining unit 1220 may determine whether an identical prediction mode is applied to each sub-block included in the macro block. When the identical prediction mode is applied to each sub-block, a unidirectional prediction mode may be referred to be applied.

According to an exemplary embodiment, the unidirectional application determining unit 1220 may determine whether the identical prediction mode is applied to each sub-block included in the macro block intended to be encoded with reference to context information of a reference macro block with respect to the macro block to be encoded.

The reference macro block may be adjacent to the macro block intended to be encoded. Also, the context information of the reference macro block may include at least one of an MB type with respect to the reference macro block, a quantization coefficient, CBP information, a coefficient value, and the like.

The prediction mode determining unit 1230 may determine the prediction mode with respect to each sub-block based on a determined result of the unidirectional application determining unit 1220. For example, when the unidirectional application determining unit 1220 applies the unidirectional prediction mode, the prediction mode determining unit 1230 may determine which prediction mode is applied to each sub-block included in the macro block.

The prediction mode determining unit 1230 may determine any one of various prediction modes illustrated in FIG. 1, as the prediction mode with respect to the macro block.

As an example, the prediction mode determining unit 1230 may encode the macro block based on the various prediction modes illustrated in FIG. 1, and determine an optimal prediction mode from among the various prediction modes. The prediction mode determining unit 1230 may calculate a rate-distortion cost of an encoded macro block based on the various prediction modes, and determine a prediction mode having a minimal rate-distortion cost as the optimal prediction mode.

The prediction mode encoding unit 1250 may store information about the prediction mode based on the determined prediction mode. According to an exemplary embodiment, when the identical prediction mode is determined to be applied to each sub-block included in the macro block, the prediction mode encoding unit 1250 may store information about whether the identical prediction mode is applied and information about the determined prediction mode.

When the identical prediction mode is not applied, the prediction mode may need to be encoded with respect to each sub-block. As a result, number of bits corresponding to a product of a number of bits required for encoding the prediction mode and a number of respective sub-blocks may be additionally needed.

However, when the identical prediction mode is applied to each sub-block, only the number of bits required for encoding the prediction mode applied to the sub-block included in the macro block may be needed. Accordingly, when the identical prediction mode is applied to each sub-block, the prediction mode may be encoded using a smaller number of bits.

According to another exemplary embodiment, one prediction mode may be applied to the entire macro block, however, one prediction mode ma be applied to a partial macro block.

According to an exemplary embodiment, a grouping unit 1240 may group divided sub-blocks into a plurality of sub-block groups. For example, the grouping unit 1240 may group consecutive sub-blocks into one sub-block group.

When prediction modes of all sub-blocks included in a specific sub-block group are identical to one another, the prediction mode encoding unit 1250 may encode whether the prediction modes are identical to one another. Also, the prediction mode encoding unit 1250 may encode information about the prediction mode applied to each sub-block. Similar to a case in which the unidirectional prediction mode is applied to the macro block, even when the prediction modes of all sub-blocks included in the sub-block group are identical to one another, the prediction mode may be encoded using a smaller number of bits.

The encoding unit 1260 may encode each sub-block based on the prediction mode determined with respect to each sub-block.

Figure 13:
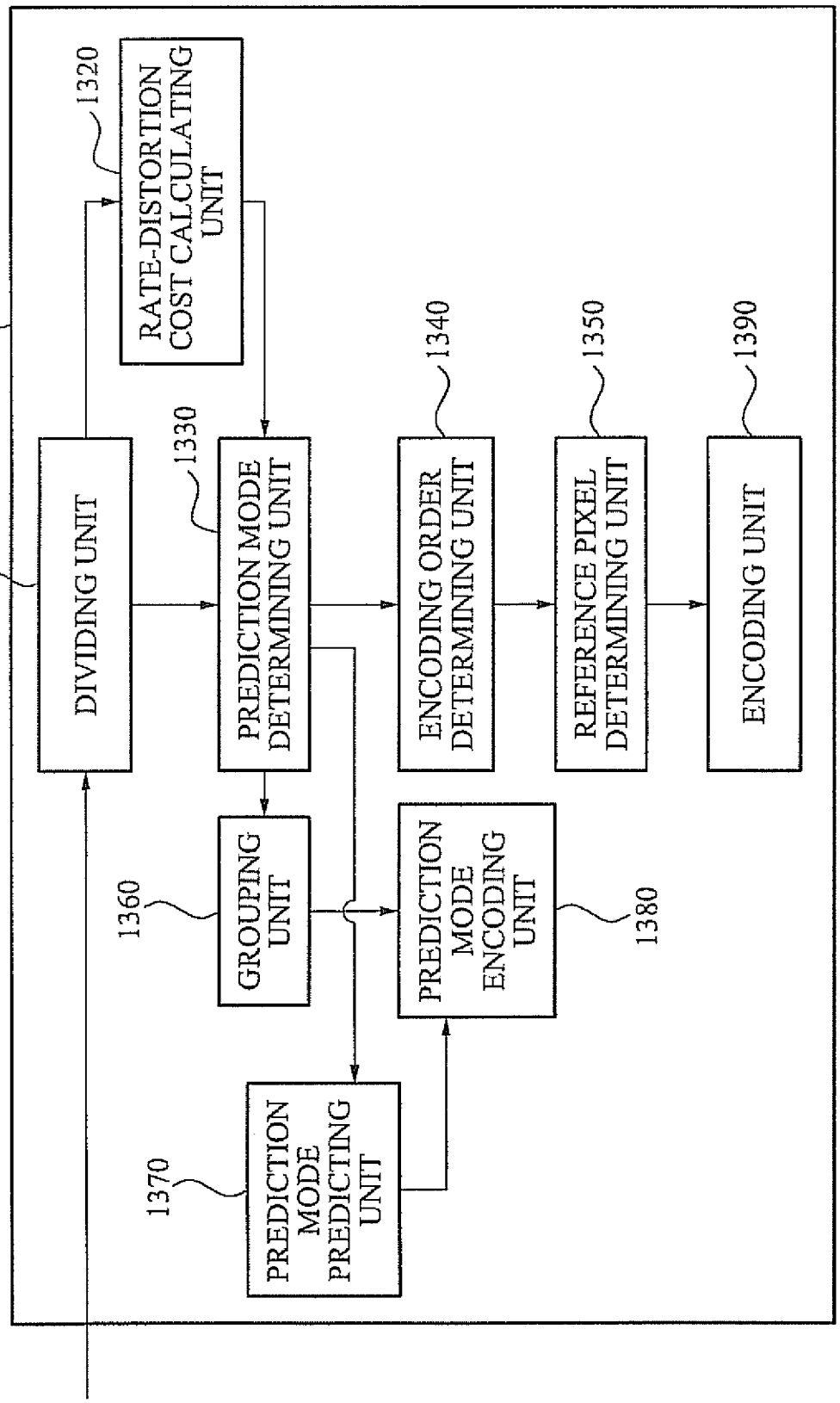
FIG. 13 is a block diagram illustrating a structure of an image encoder according to other exemplary embodiments.

FIG. 13 is a block diagram illustrating a structure of an image encoder according to other exemplary embodiments.

A dividing unit 1310 may divide a macro block into to plurality of sub-blocks.

The prediction mode determining unit 1330 may determine a prediction mode with respect to each sub-block. According to an exemplary embodiment, the prediction mode determining unit 1330 may determine one mode of the various prediction modes illustrated in FIG. 1 as the prediction mode with respect to each sub-block. Also, the prediction mode determining unit 1330 may determine different prediction modes with respect to each sub-block included in the macro block.

The prediction mode determining unit 1330 may determine the prediction mode based on a rate-distortion cost with respect to each sub-block according to the various prediction modes. The prediction mode determining unit 1330 may calculate a rate-distortion cost with respect to each sub-block, and determine a prediction mode having a minimal rate-distortion cost as an optimal prediction mode.

The encoding order determining unit 1340 may determine an encoding order with respect to each sub-block based on the prediction mode with respect to each sub-block. According to an exemplary embodiment, the encoding order determining unit 1340 may determine the encoding order with respect to each sub-block so that a sub-block intended to be encoded is encoded with reference to a sub-block having been already encoded.

A reference pixel determining unit 1350 may determine a reference pixel with respect to each sub-block considering the encoding order of each sub-block. According to an exemplary embodiment, the reference pixel determining unit 1350 may determine a pixel of the sub-block having been already encoded as the reference pixel with respect to the sub-block intended to be encoded.

According to an exemplary embodiment, a grouping unit 1360 may group divided sub-blocks into a plurality of sub-block groups, and a prediction mode encoding unit 1380 may encode whether prediction modes of sub-blocks included in each sub-block group are all the same.

Similar to a case in which the unidirectional prediction mode is applied to the macro block, even when the prediction modes of all sub-blocks included in the sub-block group are all the same, the prediction mode may be encoded using to smaller number of bits.

According to an exemplary embodiment, a prediction mode predicting unit 1370 may predict a prediction mode with respect to each sub-block. As an example, the prediction mode predicting unit 1370 may predict a prediction mode of a sub-block intended to be encoded with reference to a reference sub-block adjacent to the sub-block intended to be encoded. When the sub-block intended to be encoded and the reference sub-block are adjacent to each other, characteristics of the sub-block intended to be encoded and the reference sub-block may be similar to each other. In this case, a prediction mode of the reference sub-block and a prediction mode of the sub-block intended to be encoded may be similar to each other.

The prediction mode encoding unit 1380 may determine whether a Most Probable Mode (MPM) predicted with respect to the sub-block intended to be encoded and the prediction mode determined by the prediction mode determining unit 1370 are the same, and encode whether the predicted MPM and the determined prediction mode are the same.

When the predicted MPM and the determined prediction mode are the same, the image decoder may also similarly predict a prediction mode with respect to a sub-block intended to be decoded, and the determined prediction mode may not need to be encoded.

Figure 14:
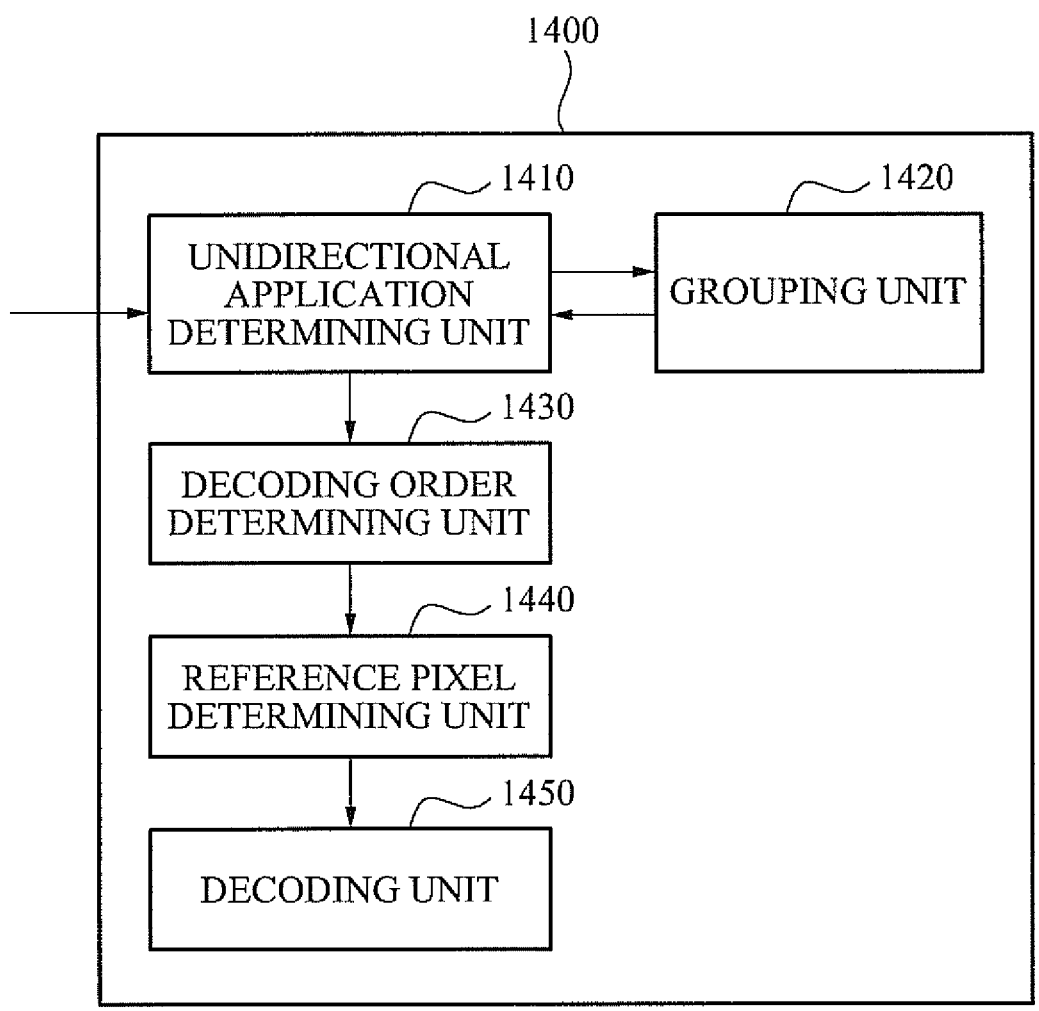
FIG. 14 is a block diagram illustrating a structure of an image decoder according to other exemplary embodiment.

FIG. 14 is a block diagram illustrating a structure of an image decoder 1400 according to other exemplary embodiment. The image decoder 1400 may include a unidirectional application determining unit 1410, a grouping unit 1420, a decoding order determining unit 1430, a reference, pixel determining unit 1440, and a decoding unit 1450.

The unidirectional application determining unit 1410 may determine whether an identical prediction mode is applied to all sub-blocks included in a macro block. According to an exemplary embodiment, the image encoder of encoding the macro block may store, in a macro block header, whether the identical prediction mode is applied to all sub-blocks, and the unidirectional application determining unit 1410 may determine, using information stored in the macro block header, whether the identical prediction mode is applied to all sub-blocks.

The decoding unit 1450 may decode each sub-block based on a determined result with respect to the macro block. When the identical prediction mode is applied to all sub-blocks included in the macro block, each sub-block may be decoded using the applied identical prediction mode.

According to another exemplary embodiment, when the identical. prediction mode is not applied to all sub-blocks included in the macro block, the grouping unit 1420 may group consecutive sub-blocks, from among the sub-blocks included in the macro block, into a sub-block group, and the unidirectional application determining unit 1410 may determine whether the identical prediction mode is applied to sub-blocks included in each sub-block group.

The decoding unit 1450 may decode each sub-block based on a determined result with respect to the macro block. When the identical prediction mode is not applied to all sub-blocks included in the macro block, each sub-block may be decoded using the applied identical prediction mode.

The decoding order determining unit 1430 may determine a decoding order with respect to each sub-block depending on the prediction mode applied to each sub-block. As an example, the decoding order determining unit 1430 may determine the decoding order of each sub-block so that each sub-block is decoded with reference to a reference sub-block having been already decoded. The decoding unit 1450 may decode each sub-block based on the determined decoding order.

The reference pixel determining unit 1440 may determine a reference pixel with respect to each sub-block considering the decoding order of each sub-block. According to an exemplary embodiment, the reference pixel determining unit 1440 may determine a pixel of a sub-block having been already decoded as the reference pixel with respect to a sub-block intended to be decoded. The decoding unit 1450 may decode each sub-block with reference to the reference pixel with respect to each sub-block.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An image decoding apparatus, comprising an intra-prediction device that performs intra prediction on a first block, performs intra prediction on a second block adjacent to a right side of the first block, performs intra prediction on a third block adjacent to a bottom of the first block, and performs intra prediction on a fourth block adjacent to a right bottom of the first block, wherein the first block, the second block, the third block, and the fourth block are predicted in one intra prediction mode, wherein decoding is performed in the order of the first block, the second block, the third block, and the fourth block.

2. An image decoding apparatus, comprising an intra-prediction device that performs intra prediction on a first block, performs intra prediction on a second block adjacent to a right side of the first block, performs intra prediction on a third block adjacent to a bottom of the first block, and performs intra prediction on a fourth block adjacent to a right bottom of the first block, wherein the first block, the second block, the third block, and the fourth block are predicted in one intra prediction mode, wherein decoding is performed in the order of the first block, the second block, the third block, and the fourth block, and wherein intra prediction mode information on the first block, the second block, the third block, and the fourth block is decoded once.

* * * * *